United States Patent [19]

Tuckey et al.

[11] Patent Number: 5,044,344
[45] Date of Patent: Sep. 3, 1991

[54] PRESSURE-RESPONSIVE FUEL DELIVERY SYSTEM

[75] Inventors: Charles H. Tuckey; James L. Thompson, both of Cass City; Thomas M. Hoover, Reese, all of Mich.

[73] Assignee: Walbro Corporation, Cass City, Mich.

[21] Appl. No.: 421,810

[22] Filed: Oct. 16, 1989

[51] Int. Cl.⁵ .............................................. F02M 37/04
[52] U.S. Cl. ..................................... 123/497; 123/494; 123/1 A
[58] Field of Search .............. 123/497, 499, 494, 509, 123/514, 1 A

[56] References Cited

U.S. PATENT DOCUMENTS

| | | | |
|---|---|---|---|
| 3,935,851 | 2/1976 | Wright | 123/497 |
| 4,248,194 | 2/1981 | Drutchas | 123/497 |
| 4,369,736 | 1/1983 | Ito | 123/1 A |
| 4,495,930 | 1/1985 | Nakajima | 123/1 A |
| 4,501,253 | 2/1985 | Gerstmann | 123/1 A |
| 4,594,968 | 6/1986 | Degobert | 123/1 A |
| 4,706,630 | 11/1987 | Wineland | 123/1 A |
| 4,756,291 | 7/1988 | Cummins | 123/497 |
| 4,770,129 | 9/1988 | Miyata | 123/1 A |
| 4,800,859 | 1/1989 | Sagisaka | 123/497 |
| 4,905,655 | 3/1990 | Maekawa | 123/1 A |

FOREIGN PATENT DOCUMENTS

| | | | |
|---|---|---|---|
| 0062958 | 4/1982 | Japan | 123/509 |
| 0140556 | 8/1982 | Japan | 123/497 |
| 0218746 | 9/1986 | Japan | 123/1 A |
| 2075598 | 11/1981 | United Kingdom | 123/497 |

Primary Examiner—Carl Stuart Miller
Attorney, Agent, or Firm—Barnes, Kisselli, Raisch, Choate, Whittemore & Hulbert

[57] ABSTRACT

A fuel delivery system for an internal combustion engine that includes a fuel supply with a fuel pump responsive to application of electrical power for supplying fuel under pressure to fuel injectors mounted on the engine. A pressure sensor is coupled to the pump/injector fuel delivery line for measuring fuel delivery pressure. A second sensor is positioned within the fuel tank and is responsive to fuel alcohol concentration. The pump motor is energized by a pulsed d.c. signal having a duty cycle that varies as a combined function of the pressure and alcohol-concentration sensor output signals so as to maintain constant fuel pressure at the injectors while automatically compensating quantity of fuel delivered by the injectors for differing fuel alcohol concentrations.

20 Claims, 2 Drawing Sheets

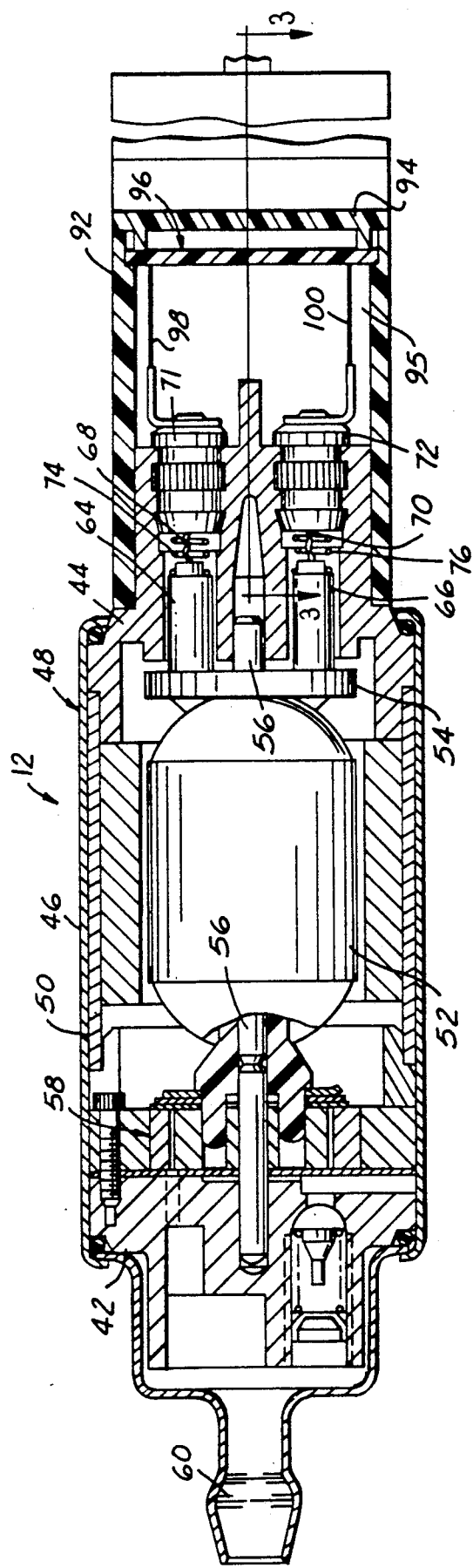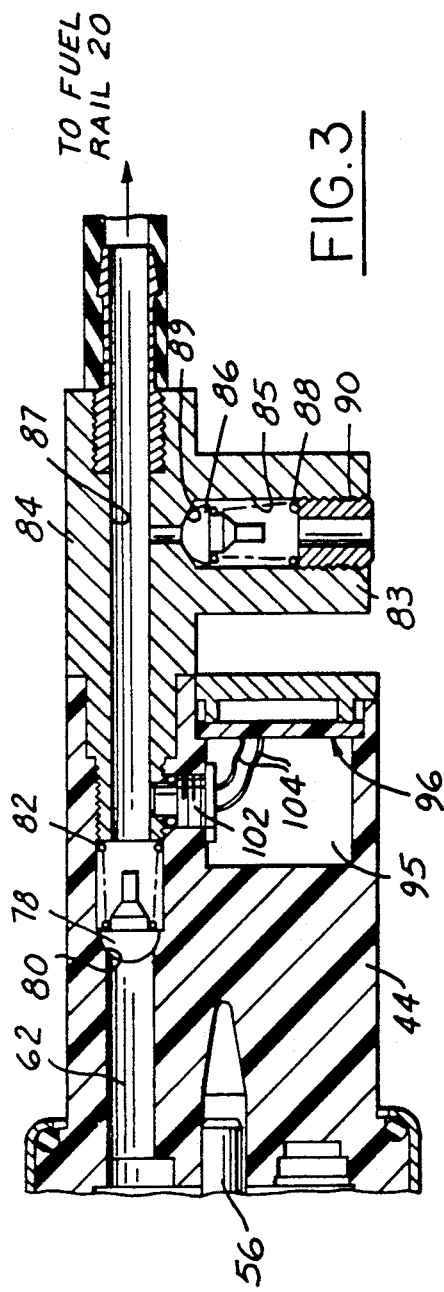

PRESSURE-RESPONSIVE FUEL DELIVERY SYSTEM

The present invention is directed to fuel delivery systems for internal combustion engines, and more particularly to a system for controlling fuel delivery as a function of fuel requirements.

BACKGROUND AND OBJECTS OF THE INVENTION

In engine fuel delivery systems of current design, fuel is typically fed by a constant-delivery pump from a fuel tank to the engine. A pressure regulator maintains constant fuel pressure at the engine, and excess fuel is returned from the engine to the fuel tank. Such return fuel carries engine heat to the fuel supply tank, and consequently increases temperature and vapor pressure in the fuel tank. Venting of excess vapor pressure to the atmosphere not only causes pollution problems, but also deleteriously affects fuel mileage. Excess fuel tank temperature can also cause vapor lock at the pump, particularly where fuel level is relatively low. Constant pump operation also increases energy consumption, while decreasing both fuel pump life and fuel filter life. It is therefore desirable not only to eliminate the necessity for the fuel return line from the engine to the supply tank (while still maintaining constant fuel pressure at the engine), but also to control pump operation as a function of fuel requirements at the engine both to maintain constant fuel pressure at the engine and to increase pump life.

U.S. Pat. No. 4,728,264 discloses a fuel delivery system in which a d.c. motor fuel pump delivers fuel under pressure from a supply tank to an engine. A pressure-sensitive switch, which may be contained within a unitary pump/motor housing, is responsive to fuel pump output pressure for applying a pulse width modulated d.c. signal to the pump motor, and thereby controlling pump operation so as to maintain constant pressure in the fuel delivery line to the engine independently of fuel demand. U.S. Pat. No. 4,789,308 discloses a self-contained fuel pump that includes an electronic sensor in the pump outlet end cap responsive to fuel outlet pressure for modulating application of current to the pump motor and maintaining a constant pressure in the fuel delivery line to the engine. Copending U.S. application Ser. No. 07/324,649 filed Mar. 17, 1989, now U.S. Pat. No. 4,926,829, discloses a fuel delivery system in which a pressure sensor is coupled to the return line from the engine for detecting return flow of excess fuel to the supply tank. The output of a pulse width modulation amplifier to the fuel pump motor is controlled as function of the signal from the pressure sensor. The noted patents and application are all assigned to the assignee hereof.

Although the fuel delivery systems disclosed in the noted patents and application address and overcome a number of problems theretofore extant in the art, further improvements remain desirable. For example, it is desirable to provide a fuel delivery system that can be employed in conjunction with fuels of differing alcohol concentrations without requiring service or operator adjustment. Potential for energy release (BTU/unit volume) for gasoline is much greater than for alcohol. For this reason, a quantity of fuel having 90% alcohol concentration delivered to the engine cylinders, for example, must be increased 50% as compared with straight gasoline to maintain constant throttle response and other engine operating characteristics. It has heretofore been proposed to accommodate increased fuel delivery by increasing injector activator time. However, the range of times necessary to accommodate all projected gasoline/alcohol mixtures exceeds the dynamic range of current injector technology.

It is therefore a general object of the present invention to provide a fuel delivery system for internal combustion engines that automatically tailors fuel delivery to fuel alcohol concentration and type (either ethanol or methanol) without operator or service intervention. Another object of the present invention is to provide a fuel delivery system of the described character in which the fuel return line from the engine to the supply is eliminated, thereby reducing the problems of vapor generation and the like previously noted, and in which fuel delivery is maintained at constant pressure (for a given fuel alcohol concentration) by selectively controlling pump operation. It is yet another object of the present invention to provide a self-contained electric-motor fuel pump for use in systems of the described character that features an economical and reliable pump package assembly.

SUMMARY OF THE INVENTION

A fuel delivery system for an internal combustion engine in accordance with the present invention includes a fuel supply with a fuel pump responsive to application of electrical power for supplying fuel under pressure. A fuel delivery mechanism, such as a fuel injector, is coupled to the fuel supply for controlled delivery of fuel from the supply to the engine. A sensor is responsive to concentration of alcohol in the fuel for providing a corresponding electrical signal, and electrical power applied to the pump is automatically varied as a function of the sensor output signal. Preferably, the pump includes a d.c. pump motor, and power is applied thereto by a pulse width modulation amplifier that produces a pulsed d.c. signal having a duty cycle that varies as a direct function of the alcohol sensor output signal.

In the preferred implementation of the invention, a pressure sensor is coupled to the fuel delivery line between the pump and the engine for supplying an electrical signal that varies as a function of fuel delivery pressure. Electrical power is applied to the pump, preferably by a pulse width modulation amplifier as previously described, as a combined function of the pressure and alcohol-concentration sensor signals. That is, the output duty cycle of the pulse width modulation amplifier increases as a function of the alcohol sensor signal and decreases as a function of the pressure sensor signal. The pressure sensor and sensor-responsive electronics are mounted in the outlet end cap of a self-contained in-line immersible fuel pump assembly, and a pressure relief valve in the outlet end cap returns fuel to the supply in the event of excess pressure in the fuel delivery line.

BRIEF DESCRIPTION OF THE DRAWINGS

The invention, together with additional objects, features and advantages thereof, will be best understood from the following description, the appended claims and the accompanying drawings in which:

FIG. 2 is a longitudinal bisection of the self-contained electric-motor fuel pump illustrated schematically in FIG. 1;

FIG. 3 is a fragmentary sectional view taken substantially along the line 3—3 in FIG. 2.

DETAILED DESCRIPTION OF PREFERRED EMBODIMENT

Figure 1:
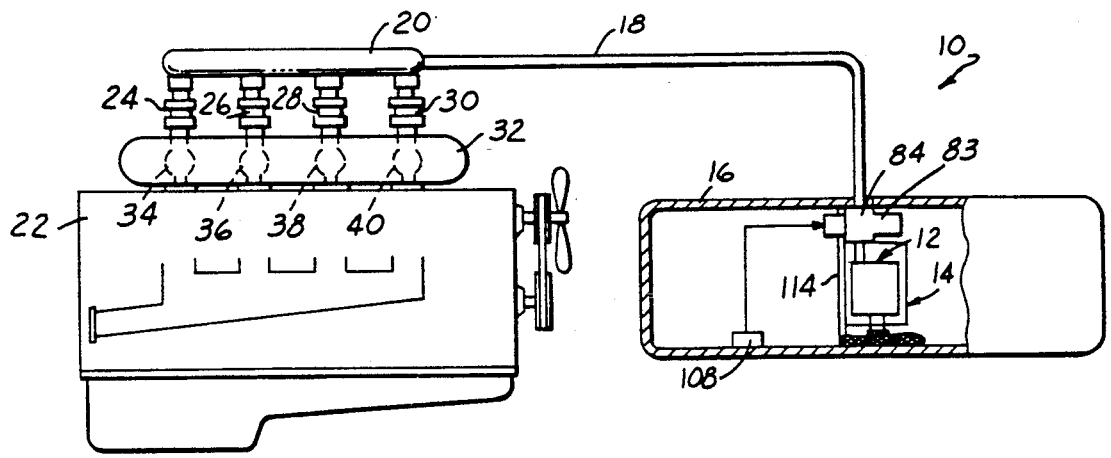
FIG. 1 is a schematic diagram of a fuel delivery system in accordance with a presently preferred embodiment of the invention.

FIG. 1 illustrates a fuel delivery system 10 in accordance with one presently preferred embodiment of the invention as comprising a self-contained electric-motor fuel pump 12 mounted within a canister 14 that is contained within and surrounded by a fuel tank 16. Fuel pump 12 delivers fuel under pressure through a fuel line 18 to a fuel rail 20 carried by an engine 22. A plurality of fuel injectors 24-30 are mounted between rail 20 and an engine air intake manifold 32 carried by engine 22, with the nozzles of the individual fuel injectors being positioned adjacent to the fuel/air intake ports 34-40 of associated cylinders of the engine. Combustion air may be supplied to manifold 32 through an air filter or the like at atmospheric pressure, or by a turbocharger or the like driven by the engine and supplying air at pressure that varies with engine operation and/or throttle demand, etc. Injectors 24-30 may be solenoid-activated, for example, responsive to an on-board engine control computer (not shown).

FIGS. 2-3 illustrate self-contained electric-motor fuel pump 12 as comprising an inlet end cap 42 and an outlet end cap 44 coaxially interconnected by a cylindrical case 46 to form a hollow pump housing 48. A permanent magnet stator 50 is carried within case 46 surrounding an armature 52 that has electrical windings connected to a commutator plate 54. Armature 52 is journaled between end caps 42,44 by a shaft 56 for rotation within housing 48. Armature 52 is coupled to a vane or gear system 58 for pumping fuel from an inlet 60 through inlet end cap 42 to the volume of housing 48 surrounding armature 52, and thence through an outlet port 62 (FIG. 3) in outlet end cap 44 to fuel rail 20 (FIG. 1) through line 18. A pair of brushes 64,66 are respectively slidably received in end cap 44 in associated passages parallel to the axis of rotation of armature 52. Brushes 64,66 are respectively connected by wire conductors 68,70 to electrical terminals 71,72 on end cap 44 for coupling brushes 64,66, commutator plate 54 and armature 52 to a source of d.c. electrical power. A pair of springs 74,76 are captured in compression between respective brushes 64,66 and associated terminals 71,72 for urging brushes 64,66 into mechanical and electrical contact with commutator plate 54. To the extent thus far described, pump 12 is similar to those disclosed in U.S. Pat. Nos. 4,352,641 and 4,596,519 assigned to the assignee hereof to which reference may be had for more detailed background discussion of such pump structure.

A check valve 78 (FIG. 3) is mounted in passage 62, and is urged against a seat 80 in end cap 44 by a coil spring 82 captured in compression between valve 78 and an outlet fitting 84. Valve 78 helps stabilize fuel flow and prevents reverse flow when pump 12 is turned off. A sleeve 83 on fitting 84 has a passage 85 that extends laterally from main fuel passage 87. A second check valve 86 within passage 85 is urged toward passage 87 against a seat 89 by a coil spring 88 captured in compression between valve 86 and a nut 90. Pressure of spring 88 against valve 86 is set by nut 90 such that an over-pressure in passage 87 and fuel line 18 causes check valve 86 to dump fuel from the pump outlet directly to fuel tank 16 (FIG. 1). A sleeve 92 on end cap 44 receives a cover 94 to form a sealed internal volume 95 that encloses terminals 71,72. An electronic circuitboard assembly 96 is captured by cover 94 against an opposing shoulder within sleeve 92. Electrical conductors 98,100 extend through volume 95 and connect circuitboard assembly 96 to terminal 71,72. An electronic pressure sensor 102 (FIG. 3) is mounted on end cap 44 between volume 95 and passage 87, and is responsive to pressure of fuel within passage 87 downstream of outlet check valve 78. Sensor 102 is connected to circuitboard assembly 96 by conductors 104.

Figure 4:
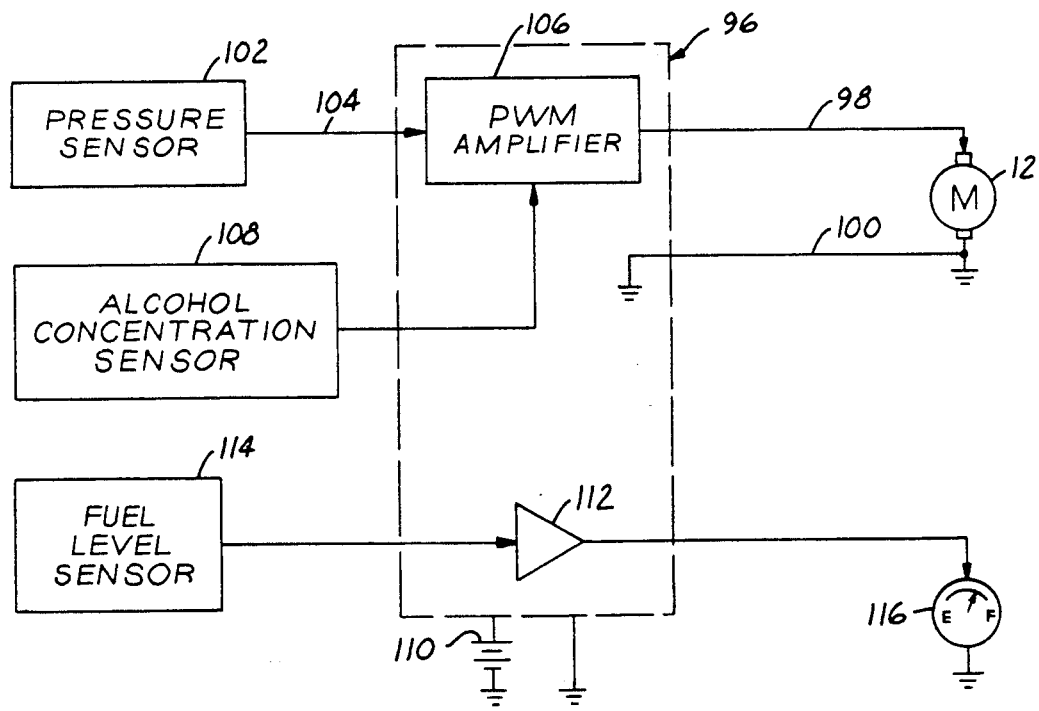
FIG. 4 is a functional block diagram of the fuel delivery system electronics.

FIG. 4 is a functional block diagram of the fuel system electronics. Pressure sensor 102, which provides an electrical signal that varies as a direct and continuous (i.e., monotonic) function of fuel pump outlet pressure, is connected to an input of a pulse width modulation amplifier 106 on circuit assembly 96. A sensor 108 (FIGS. 1 and 4) is positioned within tank 16 and provides an electronic output signal, which varies as a direct and continuous (i.e., monotonic) function of fuel alcohol concentration, to a second input of amplifier 106. Preferably, sensor 108 is indentically responsive to both methanol and ethanol. Conventional dielectric sensors exhibit differing responsive characteristics to ethanol and methanol, although such sensors may be employed if either ethanol or methanol is mandated by government regulation or industry standard. Indeces of refraction of ethanol and methanol are substantially identical, and radiant energy sensors (e.g., optical) are currently preferred for this reason. An amplifier 112 on circuit assembly 96 receives the electrical output of a fuel level sensor 114 (FIGS. 1 and 4) carried by canister 14. The output of amplifier 112 is coupled to a gauge 116 for indicating fuel level to an operator. Preferably, sensor 114 is as disclosed in U.S. application Serial No. 07/318,126, filed Mar. 2, 1989 and assigned to the assignee hereof, now U.S. Pat. No. 4,928,657. Circuit assembly 96 is also connected to the vehicle electrical system 110 and to electrical ground.

In operation, amplifier 106 provides a pulsed d.c. signal to pump 12 having a duty cycle that decreases as a continuous function, preferably a linear function, of increasing pressure at sensor 102, and that increases as a direct continuing function, preferably linear or nearly linear, of increasing alcohol concentration at sensor 108. For a given fuel alcohol concentration, the pump motor is thus driven as an inverse function of pump outlet pressure so as to maintain constant fuel pressure at rail 20 (FIG. 1). On the other hand, pump speed is also automatically compensated for changes in fuel alcohol concentration. Thus, in the event that the vehicle operator places fuels of differing alcohol concentration in the tank, sensor 108 automatically measures average alcohol concentration and modifies pump speed accordingly. For a given activation time at injectors 24-30, the quantity of fuel injected into the cylinders depends on fuel rail pressure, and therefore on fuel alcohol concentration in accordance with this aspect of the invention.

The fuel delivery system hereinabove described addresses the aforementioned problems and deficiencies in the art, and includes a number of significant features. For example, fuel alcohol concentration is measured and pump operation automatically compensated so that the fuel delivery system of the invention is suitable for use in conjunction with fuels of widely differing alcohol concentrations without any requirement or necessity for operator or service adjustment. This advantage of the invention will be of increasing importance as so-called alternative fuels of differing alcohol concentrations become more readily available. All of the fuel delivery system electronics, including not only the pump control electronics but also the fuel level sensing electronics, are contained within a unitary pump design. In this connection it will appreciated, of course, that the brush-type d.c. motor of the preferred embodiment of the fuel pump could be readily replaced by a brushless d.c. motor of any suitable construction, or by an a.c. motor, without departing in any way from the principles of the present invention in their broadest aspects. Likewise, pump 12 would be mounted externally of tank 16, although an immersible pump is preferred.

We claim:

1. A fuel delivery system for an internal combustion engine that includes:
   a fuel supply with a self-contained electric-motor fuel pump responsive to application of electrical power for supplying fuel under pressure, said pump having a pair of coaxially spaced end caps and a case joining said end caps to form a pump housing, fuel inlet means in one of said end caps and fuel outlet means in the other of said end caps, a d.c. motor having an armature journaled for rotation within said housing, and means coupled to said armature for pumping field through said housing from said inlet means to said outlet means,
   fuel delivery means on said engine coupled to said supply for controlled delivery of fuel from said supply to said engine, and
   means for applying electrical power to said pump comprising first sensor means mounted on said other end cap so as to be responsive to fuel pressure at said outlet means for supplying a first electrical signal as a function of fuel pressure in said system, second sensor means for supplying a second electrical signal as a function of a second predetermined condition of fuel at said supply, and means for applying electrical power to said pump as a combined function of said first and second signals,
   said power-applying means comprising an electrical circuitboard assembly mounted on said other end cap and including connection means for receiving said first and second sensor signals and for applying electrical power to said motor.

2. A fuel delivery system for an internal combustion engine that includes:
   a fuel supply including a fuel pump responsive to application of electrical power for supplying fuel under pressure,
   fuel delivery means on said engine,
   a fuel line having one end connected to an outlet of said pump and a second end terminating at said fuel delivery means, said fuel line forming the sole interconnection between said fuel supply and said fuel delivery means,
   means for applying electrical power to said pump, including a sensor coupled to said line between said check valve and said fuel delivery means for providing an electrical signal as a function of fuel pressure in said line and means for applying electrical power to said pump as a function of said signal,
   a check valve in said fuel line for preventing reverse flow of fuel from said fuel delivery means and said pump, and
   a pressure relief valve connected to said fuel line between said check valve and said fuel delivery means, said pressure relief valve being responsive to over-pressure in said fuel line to return fuel from said line to said supply.

3. A fuel delivery system for an internal combustion engine that includes:
   a fuel supply including a fuel pump responsive to application of electrical power for supplying fuel under pressure,
   fuel delivery means on said engine,
   a fuel line having one end connected to an outlet of said pump and a second end terminating at said fuel delivery means, said fuel line forming the sole interconnection between said fuel supply and said fuel delivery means,
   means for applying electrical power to said pump, including a sensor for providing an electrical signal as a function of fuel pressure in said line and means for applying electrical power to said pump as a function of said signal,
   a check valve in said fuel line for preventing reverse flow of fuel from said fuel delivery means and said pump,
   a pressure relief valve connected to said fuel line between said check valve and said fuel delivery means, said pressure relief valve being responsive to over-pressure in said fuel line to return fuel from said line to said supply, and
   a housing having a fuel passage extending therethrough, said sensor being mounted within said housing and communicating with said passage so as to be responsive to pressure of fuel in said passage, said pressure relief valve being mounted in said housing having a first end communicating within said passage, means at a second end of said passage for feeding fuel to said engine, and means at a second end of said pressure relief valve for returning fuel from said passage to said supply.

4. A fuel delivery system for an internal combustion engine that includes:
   a fuel supply including a fuel pump responsive to application of electrical power for supplying fuel under pressure,
   fuel delivery means on said engine,
   a fuel line having one end connected to an outlet of said pump and a second end terminating at said fuel delivery means, said fuel line forming the sole interconnection between said fuel supply and said fuel delivery means,
   means for applying electrical power to said pump,
   a check valve in said fuel line for preventing reverse flow of fuel from said fuel delivery means and said pump, and
   a pressure relief valve connected to said fuel line between said check valve and said fuel delivery means, said pressure relief valve being normally closed for blocking flow of fluid therethrough and being responsive to pressure in said fuel line above a preselected threshold to open and return fuel from said line to said supply, said power-applying means comprising a sensor for providing an electrical pressure signal as a function of fuel pressure in said line, and means for applying electrical power to said pump as a function of said pressure signal.

5. The fuel delivery system set forth in claim 4 wherein said means for applying electrical power to said pump further comprises means for providing an electrical alcohol-concentration signal as a function of concentration of alcohol in fuel at said supply, and means for applying power to said pump as a function of said alcohol-concentration signal.

6. The system set forth in claim 1 wherein said second sensor means comprises means for supplying said second electrical signal as a function of concentration of alcohol in fuel at said supply.

7. The system set forth in claim 5 wherein said power-applying means comprises means for applying electrical power to said pump as a direct function of said alcohol-concentration signal and as an inverse function of said pressure signal.

8. The system as set forth in claim 7 wherein said pump includes a d.c. pump motor, and wherein said power-applying means comprises a pulse width modulation amplifier for applying a pulsed d.c. signal to said motor at a duty cycle that increases as a function of said alcohol-concentration signal and decreases as a function of said pressure signal.

9. The system set forth in claim 5 wherein said pump includes a d.c. pump motor, and wherein said power-applying means comprises a pulse width modulation amplifier for applying a pulsed d.c. signal to said motor at a duty cycle that varies as a preselected function of said pressure and alcohol-concentration signals.

10. The system set forth in claim 5 wherein said pump comprises a self-contained electric-motor fuel pump including a pair of coaxially spaced end caps and a case joining said end caps to form a pump housing, fuel inlet means in one of said end caps and fuel outlet means in the other of said end caps, a d.c. motor having an armature journeyed for rotation within said housing, and means coupled to said armature for pumping fuel through said housing from said inlet means to said outlet means, said sensor being mounted on said other end cap so as to be responsive to fuel pressure at said outlet means, said power-applying means comprising an electrical circuitboard assembly mounted on said other end cap and including connection means for receiving said pressure and alcohol-concentration sensor signals and for applying electrical power to said motor.

11. The system set forth in claim 1 further comprising a fuel level sensor for supplying a third electrical signal as a function of fuel level at said supply, means for indicating fuel level to an engine operator, and circuit means on said circuitboard assembly responsive to said third signal for driving said indicating means.

12. The system set forth in claim 1 further comprising a pressure relief valve on said other end cap and responsive to fuel pressure at said outlet means for returning fuel to said supply.

13. The system set forth in claim 5 wherein said pump includes a d.c. pump motor, and wherein said power-applying means comprises a pulse width modulation amplifier for applying a pulsed d.c. signal to said motor at a duty cycle that varies as a direct function of said alcohol-concentration signal.

14. The system set forth in claim 5 wherein said alcohol-concentration signal providing means comprises sensor means mounted at said supply and operatively coupled to fuel contained therein for automatically providing said signal as a function of said alcohol concentration.

15. The system set forth in claim 14 wherein said pump includes a d.c. pump motor, and wherein said power-applying means comprises a pulse width modulation amplifier for applying a pulsed d.c. signal to said motor at a duty cycle that varies as a direct function of said alcohol-concentration signal.

16. The fuel delivery system set forth in claim 4 wherein said sensor is coupled to said line between said check valve and said fuel delivery means.

17. The system set forth in claim 4 further comprising a housing having a fuel passage extending therethrough, said pressure sensor being mounted within said housing and communicating with said passage so as to be responsive to pressure of fuel in said passage, said pressure relief valve being mounted in said housing having a first end communicating within said passage, means at one end of said passage for receiving fuel from said pump, means at a second end of said passage for feeding fuel to said engine, and means at a second end of said pressure relief valve for returning fuel from said passage to said supply.

18. The system set forth in claim 3 wherein said power-applying means comprises a circuitboard assembly including means for electrical connection to said pump, said pressure sensor and a source of electrical power.

19. The system set forth in claim 18 wherein said power-applying means comprises an electrical amplifier mounted in said circuitboard assembly.

20. The system set forth in claim 18 wherein said housing and said pump are of one-piece integral assembly.

* * * * *